US012335623B2

(12) United States Patent
Kim et al.

(10) Patent No.: US 12,335,623 B2
(45) Date of Patent: Jun. 17, 2025

(54) INFRASTRUCTURE AND VEHICLE FOR COMMUNICATING WITH THE SAME

(71) Applicants: Hyundai Motor Company, Seoul (KR); Kia Corporation, Seoul (KR); AJOU UNIVERSITY INDUSTRY-ACADEMIC COOPERATION FOUNDATION, Suwon-si (KR)

(72) Inventors: Hyung Joo Kim, Busan (KR); Yong Jin Kwon, Suwon-si (KR); Jin Yeong Heo, Suwon-si (KR)

(73) Assignees: HYUNDAI MOTOR COMPANY, Seoul (KR); KIA CORPORATION, Seoul (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 94 days.

(21) Appl. No.: 18/064,611

(22) Filed: Dec. 12, 2022

(65) Prior Publication Data

US 2023/0232107 A1   Jul. 20, 2023

(30) Foreign Application Priority Data

Jan. 14, 2022   (KR) .......................... 10-2022-0005599

(51) Int. Cl.
*H04N 23/695* (2023.01)
*B60W 60/00* (2020.01)
(Continued)

(52) U.S. Cl.
CPC ......... *H04N 23/695* (2023.01); *G08G 1/0175* (2013.01); *H04N 7/183* (2013.01);
(Continued)

(58) Field of Classification Search
CPC ...... H04N 23/695; H04N 7/183; H04N 23/61; H04N 7/181; G08G 1/0175;
(Continued)

(56) References Cited

U.S. PATENT DOCUMENTS 6,466,260 B1 * 10/2002 Hatae ..................... H04N 7/181
348/E7.086
7,313,265 B2 * 12/2007 Nakai ..................... G06T 7/593
382/104
(Continued)

Primary Examiner — Christopher S Kelley
Assistant Examiner — Asmamaw G Tarko
(74) Attorney, Agent, or Firm — SLATER MATSIL, LLP

(57) ABSTRACT

Provided is an infrastructure and a vehicle for communicating with the same. The infrastructure recognizes a first area and a second area, and when a proportion of the second area of the image information is greater than or equal to a reference proportion, controls first and second adjusters to change a photographing area of a camera. The vehicle recognizes a hidden area, when a proportion of the hidden area is greater than or equal to a reference proportion, transmits an adjustment command of the first camera to the infrastructure, and when the proportion of the hidden area is less than the reference proportion. The vehicle matches an image of the hidden area to second image information of the second camera to generate a top view image.

8 Claims, 11 Drawing Sheets

(51) Int. Cl.
*G06V 20/56* (2022.01)
*G06V 20/58* (2022.01)
*G08G 1/017* (2006.01)
*H04N 7/18* (2006.01)
*H04N 23/61* (2023.01)

(52) U.S. Cl.
CPC ........... *H04N 23/61* (2023.01); *B60W 60/001* (2020.02); *B60W 2420/403* (2013.01); *G06V 20/58* (2022.01); *G06V 20/588* (2022.01)

(58) Field of Classification Search
CPC ....... G08G 1/096716; G08G 1/096725; G08G 1/096783; G08G 1/164; G08G 1/04; B60W 60/001; B60W 2420/403; G06V 20/58; G06V 20/588; G06V 10/74
USPC ..... 348/148, 143, 7.087, 149, 113; 382/104, 382/106; 701/23, 301, 117
See application file for complete search history.

(56) References Cited

U.S. PATENT DOCUMENTS

| | | | | |
|---|---|---|---|---|
| 9,840,199 | B2 * | 12/2017 | Kitaura | G06T 3/10 |
| 9,900,522 | B2 * | 2/2018 | Lu | H04N 23/698 |
| 10,076,997 | B2 * | 9/2018 | Quast | B60R 1/28 |
| 10,780,880 | B2 * | 9/2020 | Wood | B60W 30/0953 |
| 10,793,067 | B2 * | 10/2020 | Ihlenburg | B60R 1/28 |
| 10,991,242 | B2 * | 4/2021 | Taylor | H04Q 9/00 |
| 11,188,034 | B2 * | 11/2021 | Theis | G05B 9/02 |
| 11,837,093 | B2 * | 12/2023 | Patel | G05D 1/0214 |
| 12,037,018 | B2 * | 7/2024 | Shalev-Shwartz | G01S 13/931 |
| 2008/0095403 | A1 * | 4/2008 | Benhammou | G06T 7/80 |
| | | | | 382/104 |
| 2009/0140881 | A1 * | 6/2009 | Sakai | G08G 1/164 |
| | | | | 340/901 |
| 2009/0267801 | A1 * | 10/2009 | Kawai | G08G 1/096783 |
| | | | | 348/148 |
| 2011/0032357 | A1 * | 2/2011 | Kitaura | G06T 3/10 |
| | | | | 348/148 |
| 2014/0163858 | A1 * | 6/2014 | Richardson | G06N 7/02 |
| | | | | 706/52 |
| 2014/0379197 | A1 * | 12/2014 | Eckert | B60T 7/22 |
| | | | | 701/28 |
| 2016/0173740 | A1 * | 6/2016 | Corby | H04N 23/60 |
| | | | | 348/148 |
| 2018/0170327 | A1 * | 6/2018 | Lee | B60T 7/22 |
| 2018/0247505 | A1 * | 8/2018 | Arai | G06V 40/10 |
| 2019/0066503 | A1 * | 2/2019 | Li | G08G 5/0013 |
| 2019/0208387 | A1 * | 7/2019 | Jiang | H04W 4/46 |
| 2020/0322897 | A1 * | 10/2020 | Hwang | H04L 1/1861 |
| 2021/0245711 | A1 * | 8/2021 | Nagata | H04N 7/181 |
| 2022/0007379 | A1 * | 1/2022 | Cao | H04W 4/40 |
| 2022/0219684 | A1 * | 7/2022 | Shimizu | B60W 30/085 |
| 2022/0319192 | A1 * | 10/2022 | Tani | G16Y 10/40 |
| 2022/0324387 | A1 * | 10/2022 | Hirohata | B60K 35/28 |
| 2023/0001922 | A1 * | 1/2023 | Lin | G06V 20/58 |
| 2023/0095384 | A1 * | 3/2023 | Sharma Banjade | G08G 1/096725 |
| | | | | 701/301 |
| 2023/0107999 | A1 * | 4/2023 | Kim | H04W 4/44 |
| | | | | 348/148 |
| 2023/0110269 | A1 * | 4/2023 | Chien | G06T 7/00 |
| | | | | 356/4.01 |
| 2023/0113474 | A1 * | 4/2023 | Ahmed | G08G 1/04 |
| | | | | 701/117 |
| 2023/0155968 | A1 * | 5/2023 | Szubbocsev | H04L 65/612 |
| | | | | 709/204 |
| 2023/0209594 | A1 * | 6/2023 | Yin | H04B 17/318 |
| | | | | 370/252 |
| 2023/0401870 | A1 * | 12/2023 | Misawa | G06V 10/70 |
| 2024/0062385 | A1 * | 2/2024 | Srinivasan | H04N 7/18 |

* cited by examiner

<IMAGE>

<RECOGNITION OF OBJECT IN IMAGE>

INFRASTRUCTURE AND VEHICLE FOR COMMUNICATING WITH THE SAME

CROSS-REFERENCE TO RELATED APPLICATIONS

This application is based on and claims priority under 35 U.S.C. § 119 to Korean Patent Application No. 10-2022-0005599, filed on Jan. 14, 2022 in the Korean Intellectual Property Office, which application is incorporated herein by reference.

TECHNICAL FIELD

The disclosure relates to an infrastructure for recognizing environmental information of a road and a vehicle for communicating with the same.

BACKGROUND

Recently, there have been development on various types of advanced driver assistance system (ADAS) that are designed to inform a driver of travel information about a vehicle to prevent an accident from occurring due to driver's inattentiveness and perform autonomous driving for driver's convenience.

One example of the ADAS is a technology for detecting an obstacle around a vehicle by installing a distance sensor on the vehicle and warning the driver of the obstacle.

Another example of the ADAS is a technology for autonomously travelling to a destination based on road information and current position information, while detecting an obstacle and avoiding the detected obstacle to autonomously drive to the destination.

Such technologies have difficulty in coping with sudden involvement of obstacles, such as people, bicycles, and pets when the view is blocked by vehicles parked around the road or stopped. In addition, such technologies have a limitation in coping with involvement of children of inattentiveness in a child protection area.

In addition, a driver assistance apparatus with forward collision avoidance (FCA) technology is implemented to, upon a suddenly involved obstacle being recognized in front of the vehicle, increase the steering power to avoid the obstacle, but it is only after the risk situation occurs.

Accordingly, there is an increasing need for a technology capable of recognizing detailed information about a wider range of road environment.

SUMMARY

The present disclosure may provide an infrastructure capable of dividing a road area into a first area and a second area based on image information of a camera, and adjusting the height, pan angle, and tilt angle of the camera when the proportion of the second area is greater than or equal to a reference proportion.

The present disclosure may provide a vehicle capable of performing at least one of collision avoidance, collision notification, and autonomous driving based on image information transmitted from an infrastructure and image information acquired from a camera.

The technical objectives of the disclosure are not limited to the above, and other objectives may become apparent to those of ordinary skill in the art based on the following descriptions.

According to an aspect of the disclosure, there is provided an infrastructure including: a camera; a first adjuster configured to adjust a height of the camera; a second adjuster configured to adjust a length of the camera; and a processor configured to: recognize a road area and an obstacle based on image information acquired by the camera; recognize a first area, in which a field of view is secured, of the road area and a second area, in which a field of view is obstructed by the obstacle, of the road area; and when a proportion of the second area to the road area of the image information is greater than or equal to a reference proportion, control the first and second adjusters to change a photographing area of the camera.

The infrastructure may further include a communicator, wherein the processor may control the communicator to transmit the image information of the changed photographing area to at least one vehicle.

The processor may be configured to, when a reference time has elapsed from a time of changing the photographing area of the camera, control the first and second adjusters so that the photographing area of the camera is switched to a reference photographing area.

When the proportion of the second area to the road area of the image information is less than the reference proportion, the processor may control the first and second adjusters to change the photographing area to a reference photographing area.

The infrastructure may further include a communicator, wherein the processor may control the communicator to transmit the image information of the reference photographing area to at least one vehicle.

The infrastructure may further include a communicator, wherein the processor may be configured to, when an adjustment command is received from the vehicle through the communicator, control the first adjuster and the second adjuster in response to the received adjustment command, and when the adjustment of the first and second adjusters is completed, transmit the image information acquired by the camera to the vehicle.

According to another aspect of the disclosure, there is provided a vehicle including: a communicator configured to perform communication with an infrastructure and receive image information of a first camera of the infrastructure; a display; a second camera; and a processor configured to: upon first image information of the first camera of the infrastructure being received through the communicator, recognize a road area and an obstacle based on the received first image information; recognize a hidden area, in which a field of view is obstructed by the obstacle, of the road area; and when a proportion of the hidden area to the road area of the first image information is greater than or equal to a reference proportion, transmit an adjustment command of the first camera to the infrastructure, and when the proportion of the hidden area to the road area of the first image information is less than the reference proportion, match an image of the hidden area to second image information of the second camera to generate a top view image, and control display of the generated top view.

When the proportion of the hidden area is less than the reference proportion, a command maintaining a height of the first camera at a first height and a command maintaining a length of the first camera at a first length may be transmitted to the infrastructure.

The adjustment command of the first camera may include a command adjusting the height of the first camera at a second height and adjusting the length of the first camera at a second length.

The processor may be configured to, upon determining that a reference time has elapsed from a point in time at which the first camera is adjusted, transmit an adjustment command changing the height of the first camera to a first height and changing the length of the first camera to a first length.

The processor may be configured to: after the transmitting of the adjustment command of the first camera, re-recognize the road area and the hidden area based on image information re-transmitted from the infrastructure; acquire a proportion of the re-recognized hidden area to the re-recognized road area; and when the proportion of the re-recognized hidden area is less than the reference proportion, match an image of the re-recognized hidden image to the second image information of the second camera to generate a top view image, and control display of the generated top view.

The processor may be configured to, when the proportion of the re-recognized hidden area is greater than or equal to the reference proportion, control to reduce a travelling velocity.

The processor may be configured to request provision of image information about the hidden area from the infrastructure, and generate a top view image based on the image information about the hidden area transmitted from the infrastructure.

The processor may be configured to determine a possibility of collision based on the hidden area.

The processor may be configured to control autonomous driving based on the hidden area.

According to another aspect of the disclosure, there is provided an infrastructure including: a camera; a first adjuster configured to adjust a height of the camera; a second adjuster configured to adjust a length of the camera; a communicator configured to perform communication with a vehicle; and a processor configured to: in response to a request of the vehicle, allow image information acquired from the camera to be transmitted to the vehicle; upon an adjustment command of the camera being received through the communicator, control the first and second adjusters based on the received adjustment command; and upon the adjustment of the first and second adjusters being completed, allow the image information acquired from the camera to be re-transmitted to the vehicle.

The processor may be configured to, when a reference time has elapsed from a point in time at which the adjustment of the first and second adjusters is completed, control the first and second adjusters for the camera to return to a reference position.

The reference position of the camera may include a position of the camera adjusted by the first adjuster and the second adjuster to have a first height and a first length, and the adjustment command of the camera may include a command adjusting to a second height higher than the first height and adjusting to a second length longer than the first length.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF ILLUSTRATIVE EMBODIMENTS

Figure 1:
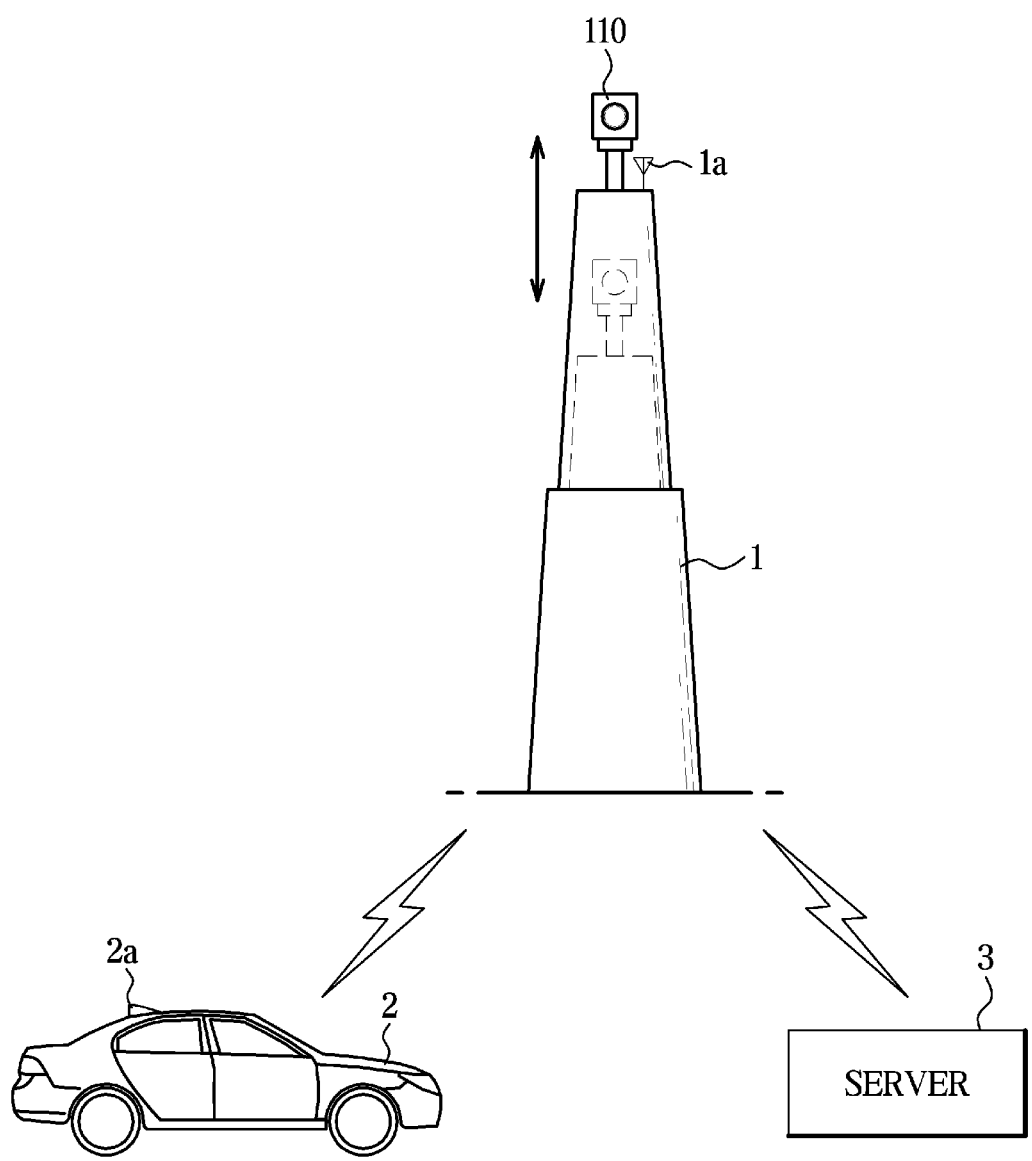
FIG. 1 is a diagram illustrating communication between an infrastructure and a vehicle according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

FIG. 1 is a diagram illustrating communication between an infrastructure and a vehicle according to an embodiment.

Referring to FIG. 1, an infrastructure 1 may include an antenna 1a and may be installed on a road.

The infrastructure 1 may receive electromagnetic waves emitted from an antenna 2a of a vehicle 2 through the antenna 1a, and use an electrical signal corresponding to the received electromagnetic waves to acquire information provided by the vehicle 2 or generate a control signal.

The infrastructure 1 transmits and receives control signals to and from a server 3.

The infrastructure 1 may transmit the electrical signal, the control signal generated according to the electrical signal, or the information acquired based on the electrical signal to the server 3 through a cable.

The infrastructure 1 may allow the antenna 1a to emit electromagnetic waves regarding the generated control signal or the acquired information. In this case, the vehicle 2 located in the vicinity of the infrastructure 1 may receive the electromagnetic waves emitted from the antenna 1a of the infrastructure 1.

The antenna 1a of the infrastructure 1 may, upon receiving electromagnetic waves emitted from the antenna 2a of the vehicle 2, transmit an electrical signal corresponding to the received electromagnetic waves to the server 3, and upon receiving an electrical signal from the server 3, convert the electrical signal into electromagnetic waves, and emit the converted electromagnetic waves.

The infrastructure 1 may include a first camera 110 that acquires an image of the surroundings.

The first camera 110 may be movable up and down, and may be movable back and forth. That is, the first camera may be adjustable in height and length.

The first camera 110 may be rotatable left and right, and rotatable up and down. The first camera 110 may be adjusted in the pan angle of left and right directions, and may be adjusted in the tilt angle up and down directions.

The first camera 110 may include a plurality of lenses and an image sensor. The image sensor may include a plurality of photodiodes that convert light into an electrical signal, and the plurality of photodiodes may be arranged in a two-dimensional matrix.

The first camera 110 may include a charge-coupled device (CCD) or a complementary metal-oxide semiconductor (CMOS) image sensor, and may include a 3D spatial recognition sensor, such as a KINECT (RGB-D sensor), a TOF (Structured Light Sensor), or a stereo camera.

The vehicle 2 may communicate with the infrastructure 1 and may communicate with other vehicles and the server 3.

The vehicle 2 may radiate electromagnetic waves to the outside through the antenna 2a. In this case, the antenna 2a may emit electromagnetic waves corresponding to an electrical signal transmitted from a processor provided in the vehicle 2.

The vehicle 2 receives electromagnetic waves emitted from at least one of the other vehicles through the antenna 2a, and converts the received electromagnetic waves into an electrical signal.

The vehicle 2 demodulates the electromagnetic waves received through the antenna 2a to convert the received electromagnetic waves into an electrical signal, and transmits the electrical signal to the processor. In this case, the processor of the vehicle 2 generates a control signal corresponding to the converted electrical signal and uses the generated control signal to control the vehicle 2.

The vehicle 2 may receive electromagnetic waves emitted from the infrastructure 1 on the road, or may emit electromagnetic waves to the infrastructure 1 on the road.

The antenna 2a of the vehicle 2 may receive electromagnetic waves transmitted from the infrastructure 1, and the processor of the vehicle 2 may, based on an electrical signal corresponding to the received electromagnetic waves, generate a control signal for a display of the vehicle 2 and control the display of the vehicle 2 such that information corresponding to the electrical signal is displayed through the display.

The vehicle 2 may perform communication (V2I communication) with the infrastructure 1.

The vehicle 2 may receive environmental information of the road from the infrastructure 1.

The vehicle 2 may receive image information about the road environment from the infrastructure 1.

The server 3 may communicate with a plurality of vehicles and may communicate with the infrastructure 1.

The server 3 may receive traffic information, environment information of the road, and the like from the plurality of vehicles and provide the traffic information, the environment information of the road, and the like to the plurality of vehicles.

The server 3 may provide the road environment information and the like to the plurality of vehicles through the infrastructure.

Figure 2:
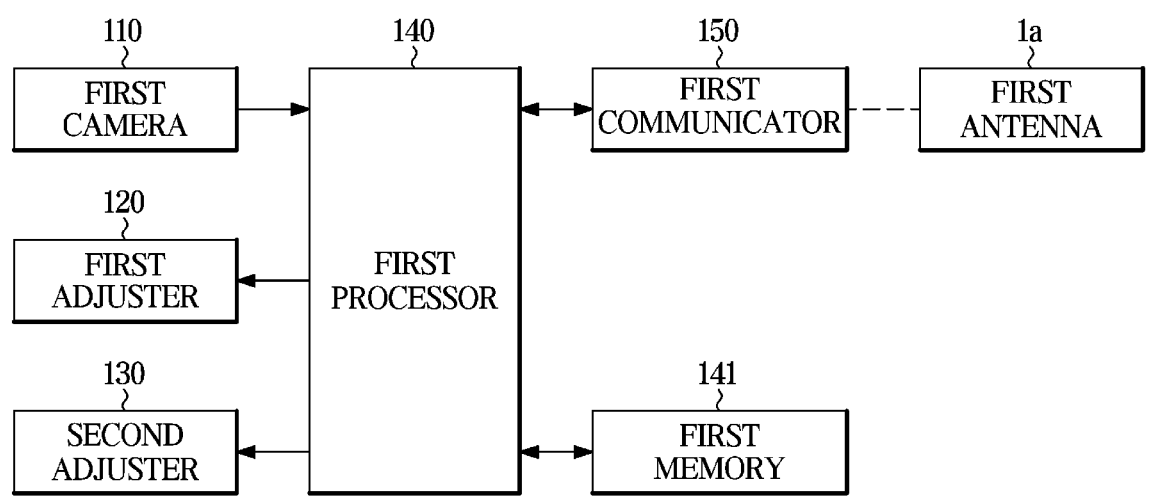
FIG. 2 is a diagram illustrating a camera of an infrastructure according to an embodiment.

FIG. 2 is a diagram illustrating an infrastructure according to an embodiment.

The infrastructure 1 includes a first camera 110, a first adjuster 120, a second adjuster 130, a first processor 140, a first memory 141 and a first communicator 150.

Among the components of the infrastructure, components having the same names as the components of the vehicle may be described using a term "first" and the corresponding components of the vehicle may be described using a term "second"

The first camera 110 acquires an image of a road of a surrounding area and transmits the acquired image information to the first processor 140. Here, the image information may include image information about the road environment.

The first camera 110 may acquire an image in response to a control command of the first processor 140.

The first adjuster 120 may be connected to the first camera 110 and adjust the height of the first camera 110. The first adjuster 120 may include a first moving member movable up and down, and may include a first motor and a first gear for moving the first moving member.

Figure 3:
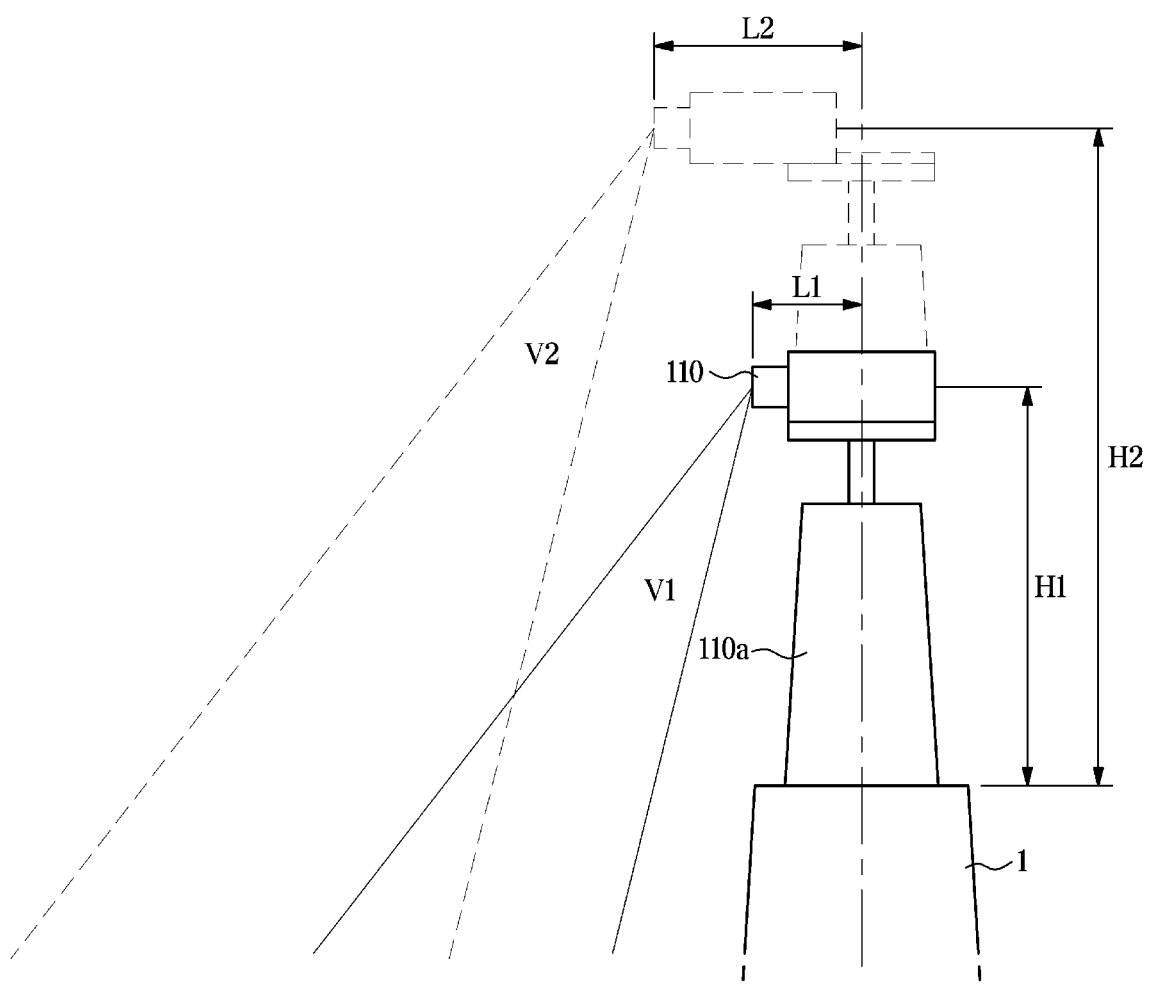
FIG. 3 is a control block diagram illustrating an infrastructure according to an embodiment.

As shown in FIG. 3, the first adjuster 120 may adjust the height of the first camera 110 to a first height H1 or a second height H2 in response to a control command of the first processor 140.

The second adjuster 130 may be connected to the first camera 110, and adjust the length of the first camera 110. The movement of the camera 110 in the length direction may be perpendicular to the movement of the camera 110 in the height direction. The second adjuster 130 may include a second moving member movable left and right, and may include a second motor and a second gear for moving the second moving member.

As shown in FIG. 3, the second adjuster 130 may adjust the length of the first camera 110 to a first length L1 or a second length L2 in response to a control command of the first processor 140.

Here, the length of the first camera 110 may be a length by which the first camera 110 protrudes from a housing 110a.

As shown in FIG. 3, the first camera 110 may move a first length L1 at a first height H1 to acquire an image for a first photographing range V1, and may move a second length L2 at a second height H2 to acquire an image for a second photographing range V2.

Here, the first height may be a reference height, and the first length may be a reference length.

A state adjusted to the reference height and the reference length may be a state in which the camera is arranged at a reference position.

The second photographing range V2 may be wider than the first photographing range V1.

The first processor 140 may recognize a first area, in which the field of view is secured, and a second area, in which the field of view is obstructed by an obstacle, based on the image information acquired by the first camera 110, acquire a proportion of the second area to the road area of the image information, and when the acquired proportion of the second area is greater than or equal to a reference proportion, control the first adjuster 120 to change the height of the first camera 110 to the second height and control the second adjuster 130 to change the length of the first camera 110 to the second length, so that the photographing area of the first camera 110 is changed.

Details thereof will be described with reference to FIGS. 4 to 7.

Figure 4:
FIGS. 4 to 7 are diagrams illustrating recognition of first and second areas of an infrastructure according to an embodiment.

Referring to FIG. 4, the first processor 140 may receive image information from the first camera 110.

Figure 5:
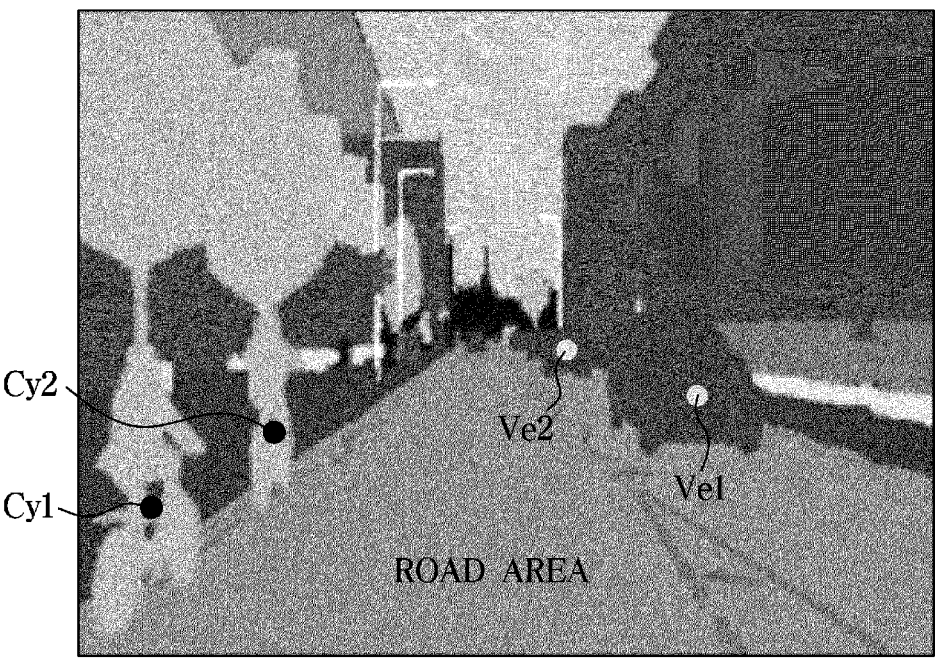

FIG. 5, the first processor 140 may recognize a road area based on the image information and recognize objects corresponding to obstacles existing in the road area.

The object may include a vehicle, a road, a pedestrian, a cyclist, a street tree, a street light, a median, a traffic light, a road sign, and the like.

The first processor 140 may recognize the object through learning through artificial intelligence (AI).

For example, the learning may be deep learning based on a convolutional neural network (CNN).

The first processor 140 may recognize an object using an artificial neural network.

As shown in FIG. 5, the first processor 140 acquires position information and size information of the recognized objects based on pixels of the image information.

For example, position information and size information of objects may be acquired as follows.

The center position of a first vehicle Ve1: (10, 21), the size of the first vehicle Ve1: (5, 3)

The center position of a second vehicle Ve2: (20, 21), the size of the second vehicle Ve2: (5, 3)

The center position of a first cyclist Cy1 (5, −3), the size of the first cyclist Cyr (1, 0.1)

The center position of a second cyclist Cy2 (8, −3), the size of the second cyclist Cy2: (1, 0.1)

The positions of each corner of the road (0, −4), (0, 30), 100, −4), and (100, 30)

Figure 6:
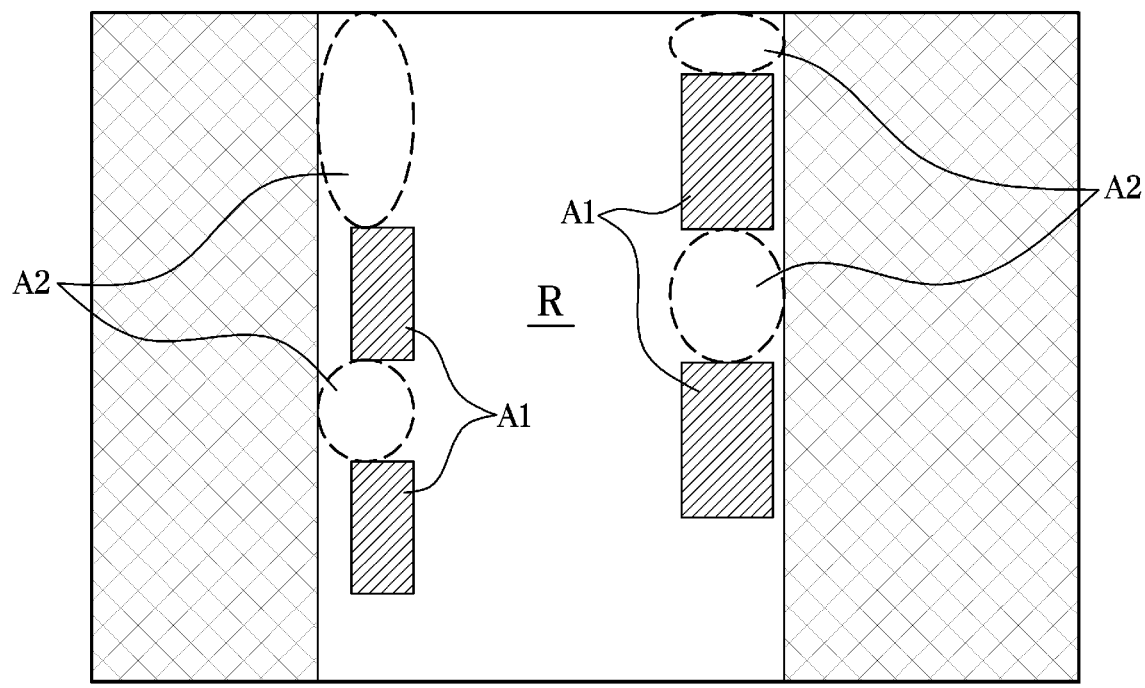
Figure 7:
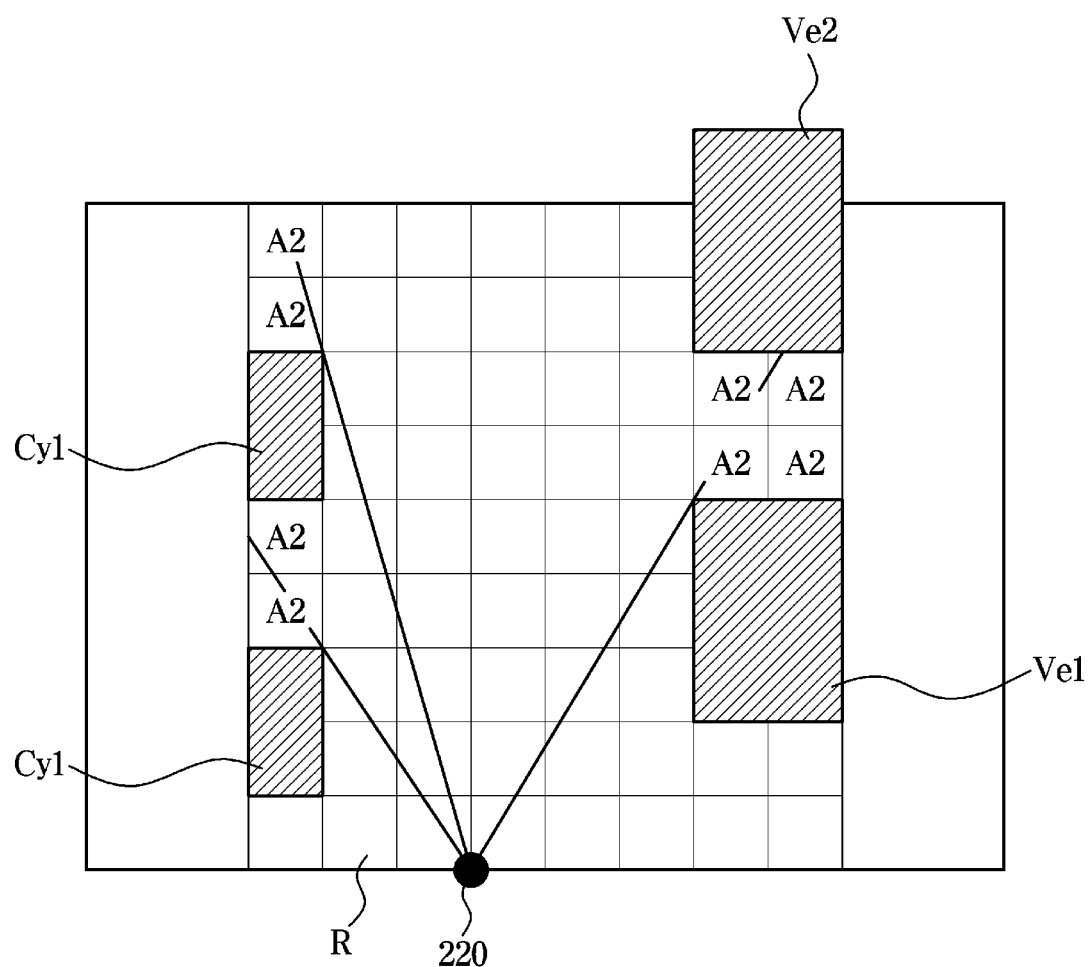

As shown in FIG. 6, the first processor 140 identifies a first area A1 occupied by an object in the road area based on the acquired position information and size information of the objects, and recognizes a second area A2 except for the first area A1 in the road area.

More specifically, the first processor 140 divides a road area R into N×M blocks, connects straight lines to the objects from the position of a second camera 220 of the vehicle 2, at which to provide image information, and recognize the second area A2 based on straight lines that intersect the outer edges of the object among the connected straight lines.

That is, the first processor 140 may recognize an area, formed by the outer edge of the object and the straight line intersecting the outer edge of the object in the road area, as the second area.

The first processor 140 identifies the number of blocks recognized as the second area, and based on the number of blocks forming the road area and the number of blocks recognized as the second area, acquires a proportion of the second area.

For example, the proportion of the second area may be acquired as 5/72*100%.

The processor 140 controls the communicator 150 to transmit image information about a changed photographing area to the vehicle 2 and other vehicles.

The processor 140 may also control the communicator 150 to transmit image information about the changed photographing area to the server 3.

The processor 140, when the proportion of the second area to the road area of the image information is less than a reference proportion, controls the first adjuster 120 so that the height of the first camera 110 becomes the first height, and controls the second adjuster 130 so that the length of the first camera 110 becomes the first length, thereby switching the photographing area of the first camera 110 into a reference photographing area.

The processor 140 may, when the current height of the first camera 110 is the first height and the current length of the first camera 110 is the first length, maintain the position of the first camera 110.

The processor 140 controls the communicator 150 to transmit image information of the reference photographing area to the vehicle 2 and other vehicles.

The processor 140 may control the communicator 150 to transmit image information of the reference photographing area to the server 3.

The processor 140 may, in response to a request of the vehicle 2, adjust the height and length of the first camera 110, and transmit image information acquired by the first camera 110, of which the height and length are adjusted, to the vehicle 2.

The processor 140 may include a memory (not shown) for storing data regarding an algorithm for controlling the operations of the components of the infrastructure 1 or a program that represents the algorithm, and a processor (not shown) that performs the above-described operations using the data stored in the memory. In this case, the memory and the processor may be implemented as separate chips. Alternatively, the first memory 141 and the first processor 140 may be implemented as a single chip.

The first memory 141 may store information about the first height and the second height and information about the first length and the second length.

The first memory 141 may store information about the reference proportion.

The first memory 141 may store image information about the shape of obstacles.

The first memory 141 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random-access memory (RAM), or other storage media, such as a hard disk drive (HDD), a CD-ROM, and the like, but the implementation of the first memory 141 is not limited thereto.

The first communicator 150 may include one or more components that enable communication with the server 3 and the vehicle 2, for example, at least one of a short-range communication module, a wired communication module, and a wireless communication module.

The short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, and a Zigbee communication module.

The wired communication module may include various wired communication modules, such as a controller area network (CAN) communication module, a local area network (LAN) module, a wide area network (WAN) module, or a value added network communication (VAN) module, and various cable communication modules, such as a universal serial bus (USB) module, a high definition multimedia interface (HDMI) module a digital visual interface (DVI) module, a recommended standard-232 (RS-232) module, a power line communication module, or a plain old telephone service (POTS) module.

The wired communication module may further include a Local Interconnect Network (LIN).

The wireless communication module may include wireless communication modules supporting various wireless communication methods, such as a Wi-Fi module, a wireless broadband module (Wibro) module, a global system for mobile communication (GSM) module, a code division multiple access (CDMA) module, a wideband code division multiple access (WCDMA) module, a universal mobile telecommunications system (UMTS) module, a time division multiple access (TDMA) module, a long term evolution (LTE) module, and the like.

Meanwhile, the components shown in FIG. 2 may refer to a software component and/or a hardware component, such as a Field Programmable Gate Array (FPGA) and an Application Specific Integrated Circuit (ASIC).

At least one component may be added or omitted to correspond to the performance of the components of the infrastructure shown in FIG. 2. In addition, the mutual positions of the components may be changed to correspond to the performance or structure of the system.

Figure 8:
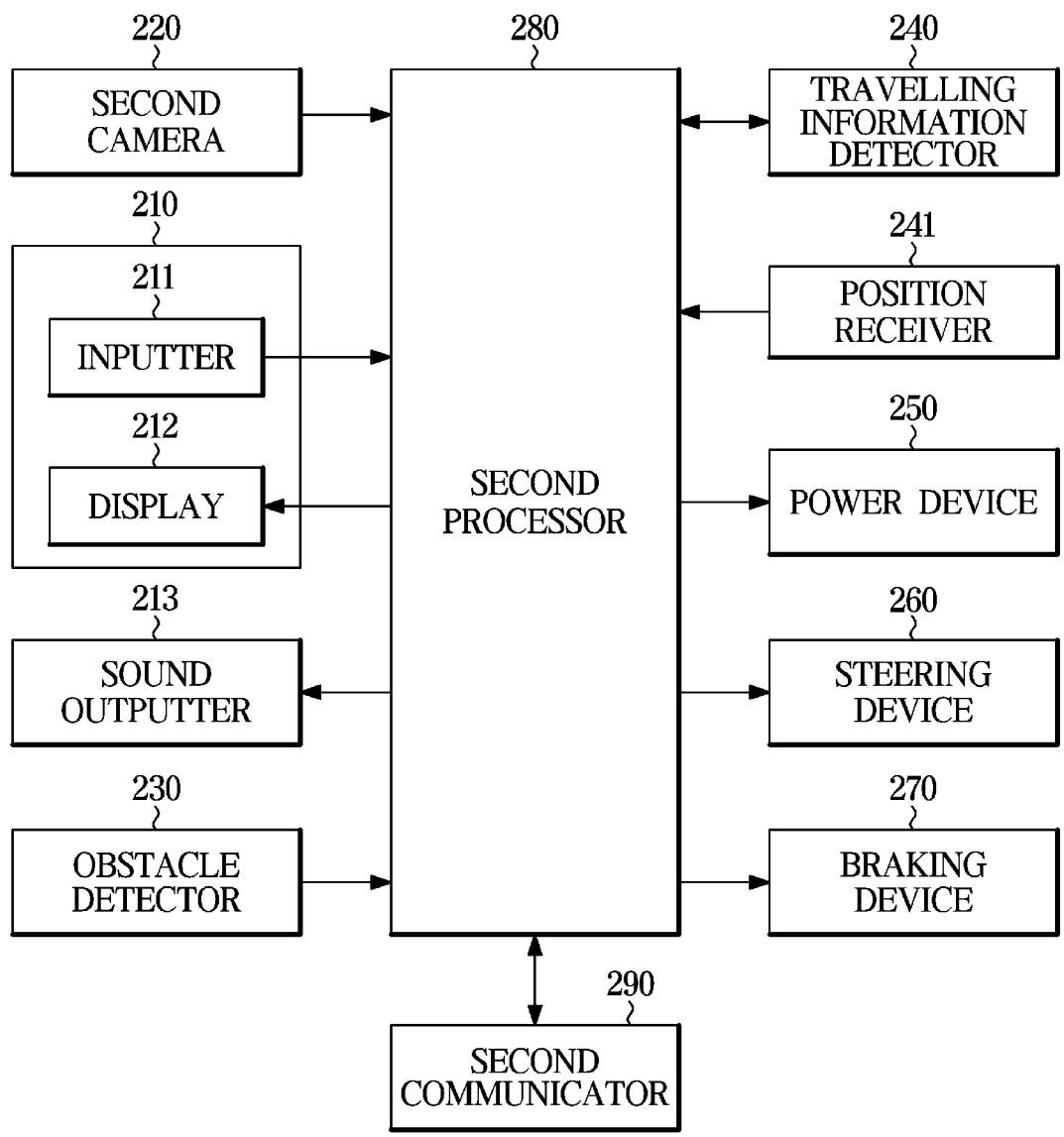
FIG. 8 is a control block diagram illustrating a vehicle performing communication with an infrastructure according to an embodiment.

FIG. 8 is a control block diagram illustrating a vehicle performing communication with an infrastructure according to an embodiment.

Before describing the control configuration of the vehicle, the structure of the vehicle will be described first.

The vehicle 2 includes a body having an interior and an exterior, and a chassis which is a part of the vehicle 2 except for the body, in which mechanical devices required for traveling are installed.

The exterior of the body includes a front panel, a bonnet, a roof panel, a rear panel, a plurality of doors provided to open and close the indoor space, and window glasses (referred to as windows) provided on the plurality of doors to be openable and closable.

The vehicle may include a front windshield glass installed on the front side of the vehicle and a rear windshield glass installed on the rear side of the vehicle.

The vehicle includes a side mirror that provides the driver with a rear view of the vehicle and a left/right side and rear view of the vehicle, and lamps that allows the driver to easily identify information about the surroundings of the vehicle while keeping eyes forward and performs a function of signaling and communication with other vehicles and pedestrians.

As shown in FIG. 8, the vehicle 2 includes a user interface 210, a sound outputter 213, a second camera 220, an obstacle detector 230, a travelling information detector 240, a power device 250, a steering device 260, a braking device 270, a second processor 280, a second memory 281, and a second communicator 290.

The user interface 210 may receive a user input and display an image corresponding to the user input.

The user interface 210 displays information about at least one of an audio mode, a video mode, a navigation mode, a DMB mode, and a radio mode.

The user interface 210 may provide navigation information to the processor 280 when performing a navigation function.

The user interface 210 may display autonomous driving control information in an autonomous driving mode and may also display images of surroundings of the vehicle in an autonomous driving mode.

The user interface 210 displays a map image within a certain range from the current location of the vehicle in a map display mode, displays map information, to which route information from the current location to the destination is matched, and road guidance information in a navigation mode.

The user interface 210 may also display images acquired by the second camera 220, and display images acquired by the first camera 110 of the infrastructure and the second camera 220, as a top view image.

The user interface 210 may include a display. In this case, the user interface 210 may receive a user input through an inputter provided in a head unit, a center fascia, a steering wheel, or the like of the vehicle.

The user interface 210 may include both an inputter and a display. In this case, the user interface may be provided as a touch screen in which a touch panel and a display panel are integrated.

In the embodiment, a user interface equipped with both the inputter and the display will be described.

The inputter 211 may receive operation commands of various functions that are performed in the vehicle as a user command.

The inputter 211 may receive destination information when an autonomous driving mode or a navigation mode is performed.

The inputter 211 may receive a command for movement and command for selection of a cursor displayed on the display 212 of the user interface.

The inputter 211 may include at least one physical mechanism, such as an on/off button for various functions that are performable in the vehicle, and a button, a key, a switch, a lever, a dial, and the like for changing a set value of various functions.

The display 212 displays information about a function being performed in the vehicle and information input by the user.

The display 212 may display on/off information of an autonomous driving mode.

The display 212 may display a current travelling mode, that is, an autonomous driving mode or a manual driving mode.

The display 212 may display an image of surroundings in an autonomous driving mode, and display the relative positions of obstacles together with an emoticon of the vehicle.

The display 212 may also display images acquired by the first and second cameras.

The display 212 may display warning information about the possibility of collision.

The sound outputter 213 may output sound in response to a control command of the processor 182, in which the sound may be output with a type of sound and volume level corresponding to the control command of the processor 182.

The sound outputter 213 may output various types of alarm sounds and speeches.

The sound outputter 213 may output navigation information as sound.

The sound outputter 213 may be a speaker and may be a Klaxon.

The second camera 220 acquires an image of surroundings and outputs image information about the acquired image. The second camera 220 may photograph the surroundings of the vehicle so that the second processor 280 may recognize other vehicles, pedestrians, cyclists, lanes, road signs, and the like.

The second camera 220 may include one, or two or more cameras.

The second camera 220 may acquire a road image corresponding to the front area of the vehicle. In this case, the front camera may be provided on the front windshield glass or on the front panel.

The second camera 220 may be provided on a rearview mirror inside the vehicle or roof panel to be exposed to the outside, or may be provided on a license plate on the front of the vehicle, a grill on the front of the vehicle, or an emblem on the front of the vehicle. The field of view of the front camera provided on the roof panel may be the front of the vehicle.

The second camera 220 may acquire a road image corresponding to the side of the vehicle. In this case, the side cameras may be provided on side mirrors on the left and right sides of the vehicle.

The second camera 220 may acquire a road image corresponding to the rear area of the vehicle. In this case, the rear camera may be provided on the rear windshield glass to have a field of view facing the outside of the vehicle, may be provided on the rear panel, or may be provided on the tailgate.

The rear camera may be provided on a license plate on the rear of the vehicle, an emblem on the rear of the vehicle, or a roof panel to be exposed to the outside. The field of view of the rear camera provided on the roof panel may be the rear of the vehicle.

The second camera 220 may be a rotatable camera, and may be provided on the roof panel.

The second camera 220 detects object information on surroundings the vehicle and converts the object information into an electric image signal. The second camera 220 detects object information on the front, left and right sides of the subject vehicle, and transmits an image signal of the detected object information to the second processor 280.

The second camera 220 may include a plurality of lenses and an image sensor. The image sensor may include a plurality of photodiodes for converting light into electrical signals, and the plurality of photodiodes may be arranged in a two-dimensional matrix.

The second camera 220 may include a charge-coupled device (CCD) or a complementary metal-oxide semiconductor (CMOS) image sensor, and may include a 3D spatial recognition sensor, such as a KINECT (RGB-D sensor), a TOF (Structured Light Sensor), or a stereo camera.

The second camera 220 may be a rear camera, a camera of a black box, a camera of an autonomous driving control device provided for autonomous driving, or a camera for user authentication.

The obstacle detector 230 detects an obstacle in the surrounding area.

The obstacle detector 230 may be provided on the front panel and the rear panel.

The obstacle detector 230 detects the presence or absence of an obstacle in the forward, backward, left, and right directions based on the position of the subject vehicle 2 and the position of the obstacle. Here, the position of the obstacle may include a relative distance and a relative direction to the vehicle 2.

In more detail, the obstacle detector 230 detects an obstacle located outside the subject vehicle, for example, stationary objects such as structures installed around the road, other vehicles in front of the subject vehicle, other vehicles behind the vehicle, oncoming vehicles approaching in the opposite lane, pedestrians, animals, and the like.

That is, the obstacle detector 230 outputs detection information of the obstacles located on the front, rear, left and right sides of the subject vehicle.

That is, the obstacle detector 230 detects obstacles located on the front, rear, left and right sides of the subject vehicle, and outputs detection information on the detected obstacles.

The obstacle detector 230 may be provided on at least one of a front panel and a rear panel of the vehicle, or may be provided on a side sill panel on the lower side of the door.

The obstacle detector 230 may include a radio detection and ranging (RADAR) sensor or a light detection and ranging (LIDAR) sensor.

The radar sensor is a sensor configured to detect the position and distance of an object using reflected waves generated by emission of radio waves when transmission and reception are performed in the same place.

The LIDAR sensor is a non-contact distance detection sensor using the laser radar principle.

Since the LIDAR sensor has a higher accuracy in lateral direction detection when compared to a radio detecting and ranging RADAR sensor, the use of the LIDAR sensor may increase the accuracy of determining whether a passage exists in the front area.

The obstacle detector 230 may include an ultrasonic sensor or radar sensor.

The ultrasonic sensor generates ultrasonic waves for a predetermined period of time, and detects a signal, which is reflected by an object and then returns.

Such an ultrasonic sensor may be used to determine the presence or absence of an obstacle, such as a pedestrian, in a short range.

The obstacle detector 230 transmits detection information about detected obstacles to the processor 182.

The travelling information detector 240 detects various types of information related to travelling of the vehicle 2.

The travelling information detector 240 may further include a velocity detector for detecting the travelling velocity of the vehicle.

The velocity detector may include a plurality of wheel velocity sensors provided in a plurality of wheels of the vehicle, and may include an acceleration sensor for detecting acceleration of the vehicle.

The vehicle 2 may further include a steering angle detector for detecting the angle of the steering wheel, and may further include a yaw rate detector.

The position receiver 241 receives position information corresponding to the current position of the vehicle.

The position receiver may include a Global Positioning System (GPS) receiver. The GPS receiver includes an antenna module for receiving signals of a plurality of GPS satellites and a signal processor.

The signal processor includes software for acquiring the current position using distance and time information corresponding to the position signals of the plurality of GPS satellites, and a transmitter for transmitting the acquired position information of the vehicle.

The power device 250 may be a device that generates a driving force for a vehicle. In the case of an internal combustion engine vehicle, the power device may include an engine and an engine control unit. In the case of an eco-friendly vehicle, the power device may include a motor, a battery and a motor control unit, and a battery management device.

In the case of an internal combustion engine vehicle, the power device may control the engine in response to an accelerating intention of a driver via the accelerator pedal. For example, the engine control unit may control the torque of the engine.

The steering device 260 may be device for changing the travelling direction of the vehicle.

The steering device 260 may change the travelling direction in response to a steering intention of a driver through the steering wheel. The steering device may include an electronic steering control unit, and the electronic steering control unit may decrease the steering force when travelling at a low velocity or parking, and increase the steering force when travelling at a high velocity.

The braking device 270 may be a device that generates braking force in the vehicle.

The braking device 270 may decelerate the vehicle 2 or stop the vehicle 2 through friction with the wheels.

The braking device 270 may include an electronic brake control unit. The electronic brake control unit may, in response to a braking intention of the driver through a braking pedal and/or a slip of the wheels, control the braking force. For example, the electronic brake control unit may temporarily deactivate the braking of the wheels in response to a slip of the wheels detected at a time of braking of the vehicle 2 (anti-lock braking systems: ABS).

The electronic brake control unit may selectively deactivate braking of the wheels in response to over-steering and/or under-steering detected at a time of steering of the vehicle 2 (electronic stability control: ESC)

In addition, the electronic brake control unit may temporarily brake the wheels in response to a slip of the wheels detected at a time of driving of the vehicle 2 (traction control system: TCS).

The second processor 280 may perform an autonomous driving mode that enables autonomous driving from the current position to the destination based on current position information of the vehicle, map information, and destination information, and an autonomous parking mode that enables autonomous parking upon arrived at the destination or temporarily parked.

The second processor 280 may determine the possibility of collision with a nearby obstacle and may output warning information in response to the possibility of collision.

The second processor 280 may, upon identifying that a travelling mode input to the inputter 211 is a manual travelling mode, control travelling based on pressing information of the brake pedal, pressing information of the accelerator pedal, and steering information of the steering wheel.

The second processor 280, upon identifying that a travelling mode input to the inputter 211 is an autonomous driving mode, autonomously travels while controlling braking, acceleration and steering based on navigation information to a destination, image information of the second camera 220, and obstacle information of the obstacle detector 230.

More specifically, the second processor 280, in a navigation mode or autonomous driving mode, generates a route from the current position to the destination based on current position information received by the position receiver 241 and destination information input to the inputter 211 and controls travelling based on route information of the generated route and map information.

The second processor 280 may generate navigation information by matching route information and current position information to map information, and control the display 212 of the user interface to display the generated navigation information.

The second processor 280 may control the vehicle to travel at a target travelling velocity during the autonomous driving mode. Here, the target travelling velocity may be a preset travelling velocity or a travelling velocity input by a user.

The processor 280 may, in an autonomous driving mode, process front image information of the camera, front radar data of the front radar, and corner radar data of the plurality of corner radars, and generate a braking signal and a steering signal for controlling the braking device 270 and the steering device 260, and generate a power signal for controlling the power device 250.

The second processor 280 may recognize obstacles in front of the vehicle 2 based on the front image data of the second camera 220 and the front radar data of the front radar, and may acquire position information (direction) and type information (e.g., whether the obstacle is another vehicle, a pedestrian, a cyclist, a cub, a guard rail, a roadside tree, a street lamp, or the like) of the recognized obstacles.

The second processor 280 may acquire position information (distance and direction) and velocity information (relative velocity) of the obstacles in front of the vehicle 2 based on the detection information of the obstacle detector 230.

The second processor 280 may match the obstacles detected by the front image data with the obstacles detected by the front radar data, and acquire the type information, the position information, and the velocity information of the obstacles in front of the vehicle 2 based on a result of the matching.

The second processor 280 may generate a braking signal and a steering signal based on the type information, the position information, and the velocity information of the front obstacles.

For example, the second processor 280 may calculate a time to collision (TTC) between the vehicle 2 and the front obstacle based on the position information (relative distance) and the velocity information (relative velocity) of the front objects, and based on a result of comparing the TTC with a predetermined reference time, warn the driver of a collision, transmit a braking signal to the braking device 270, or transmit a steering signal to the steering device 260.

The second processor 280 may calculate a distance to collision (DTC) based on the velocity information (relative velocity) of front objects, and based on a result of comparing the DTC with distances to the front objects, warn the driver of a collision or transmit a braking signal to the braking device 270.

The second processor 280 may, upon determining that there is a possibility of collision with an obstacle while travelling, control output of warning information regarding the possibility of collision, and may control the sound outputter 213 to output a sound.

The second processor 280 may, in response to receiving image information from the second camera 220 during an autonomous driving mode, perform image processing on the image information to recognize lane lines of the road, and recognize a lane in which the vehicle travels based on position information of the recognized lane lines.

The second processor 280 may generate a tracking line based on information about the recognized lane and information transmitted from the second camera 220 and the obstacle detector 230, generate a travelling route based on the position of the generated tracking line, and control autonomous driving along the generated travelling route.

The tracking line is a line for allowing the center of the body of the vehicle to follow one position on the lane. Here, the one position on the lane may represent the position of one of two lane lines constituting the lane, or the position in the middle between the two lane lines.

The second processor 280 may recognize a hidden area (i.e., the second area) based on image information received from the infrastructure 1 while travelling, and based on information about the recognized hidden area, control autonomous driving or determine the possibility of a collision with the obstacle.

The obstacle may include a street tree, a traffic light, a crosswalk, a pedestrian, a cyclist, a median, a road sign, and the like.

The second processor 280 may request the infrastructure 1 to provide image information. In this case, the second processor 280 may transmit current position information and identification information of the vehicle 2 to the infrastructure 1.

The second processor 280 may receive image information of a road, to which the position information of a hidden area is matched, from the infrastructure 1.

The second processor 280 may receive image information of a road from the infrastructure 1 and recognize a hidden area from the received image information. In this case, the second processor 280 may transmit a command for adjusting the height and length of the first camera 110 to the infrastructure 1 based on the proportion of the hidden area.

The second processor 280 may perform autonomous driving control, perform autonomous parking control or determine the possibility of collision with an obstacle based on image information of the first camera 110 with an adjusted height and length being transmitted from the infrastructure 1.

A configuration for recognizing the hidden area in the second processor 280 may be the same as a configuration for recognizing the second area in the infrastructure 1.

The second processor 280 may recognize a road area based on image information of the infrastructure 1 and recognize objects corresponding to obstacles existing in the road area.

The object may include a vehicle, a road, a pedestrian, a cyclist, a street tree, a street light, a median, a traffic light, a road sign, and the like.

The second processor 280 may perform object recognition using deep learning based on a convolutional neural network (CNN).

The second processor 280 acquires position information and size information of the recognized objects based on pixels of the image information.

The second processor 280 identifies a first area A1 occupied by an object in the road area and a second area A2 except for the first area in the road area based on the acquired position information and size information of the objects.

More specifically, the second processor 280 may divide a road area R into N×M blocks, connect straight lines to the objects at the position of the second camera 220 of the vehicle 2, at which to provide image information, and recognize the second area A2 based on straight lines that intersect the outer edges of the object among the connected straight lines.

That is, the second processor 280 may recognize an area, formed by the outer edge of the object and the straight line intersecting the outer edge of the object in the road area, as the second area.

The second processor 280 may identify the number of blocks recognized as the second area, and based on the number of blocks forming the road area and the number of blocks recognized as the second area, acquire a proportion of the second area.

The processor 280 may, in response to the acquired proportion of the second area being greater than or equal to a reference proportion, transmit a command for adjusting the height and length of the first camera to the infrastructure 1, and receive again the image information acquired through the first camera, of which the height and length are adjusted. Here, the command to adjust the height and length of the first camera may include a command to adjust the height and length of the first camera to the second height and the second length.

The second processor 280 may acquire the proportion of the second area based on the image information again being received, and when the acquired proportion of the second area is greater than or equal to the reference proportion, control the braking device 270 to decrease the travelling velocity.

The second processor 280 may acquire the proportion of the second area based on the image information again being received, and when the acquired proportion of the second area is less than the reference proportion, determine whether a reference time has elapsed from the time of adjusting the height and length of the first camera, and when it is determined that the reference time has elapsed, transmit a command for adjusting the height and length of the first camera to the infrastructure 1. Here, the command to adjust the height and length of the first camera may include a command to adjust the height and length of the first camera to the first height and the first length.

The second processor 280 may match information of the second area of the image acquired through the first camera 110 with an image of the hidden area among images acquired through the second camera 220, to generate a top view image.

Figure 9:
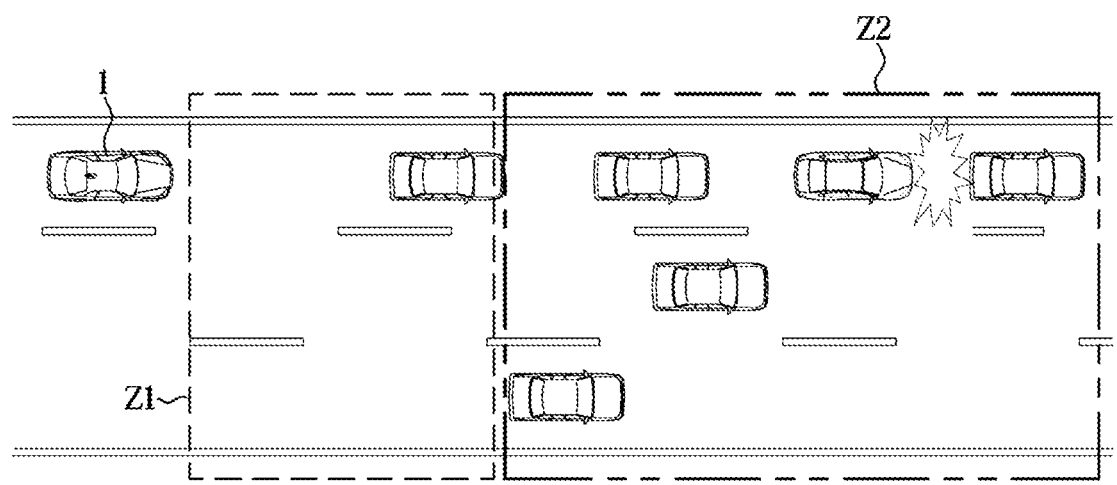
FIGS. 9 and 10 are diagrams representation of areas by a vehicle performing communication with an infrastructure according to an embodiment.
Figure 9:
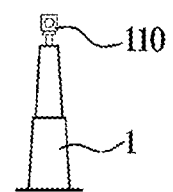

As shown in FIG. 9, when a traffic accident occurs in a front area of the same lane as the travelling lane of the vehicle 2, the vehicle 2 may not acquire an image of the traffic accident area. In this case, the second processor 280 may combine an image Z1 acquired from the vehicle 2 with an image Z2 transmitted from the infrastructure to generate a top view image, and control the display 212 to display the generated top view image.

The vehicle 2, at a time of performing U-turn, may not acquire environment information of the opposite lane, and in this case, the second processor 280 may combine an image Z1 acquired from the vehicle 2 with an image transmitted from the infrastructure to generate a top view image, and control the display 212 to display the generated top-view image.

Figure 10:
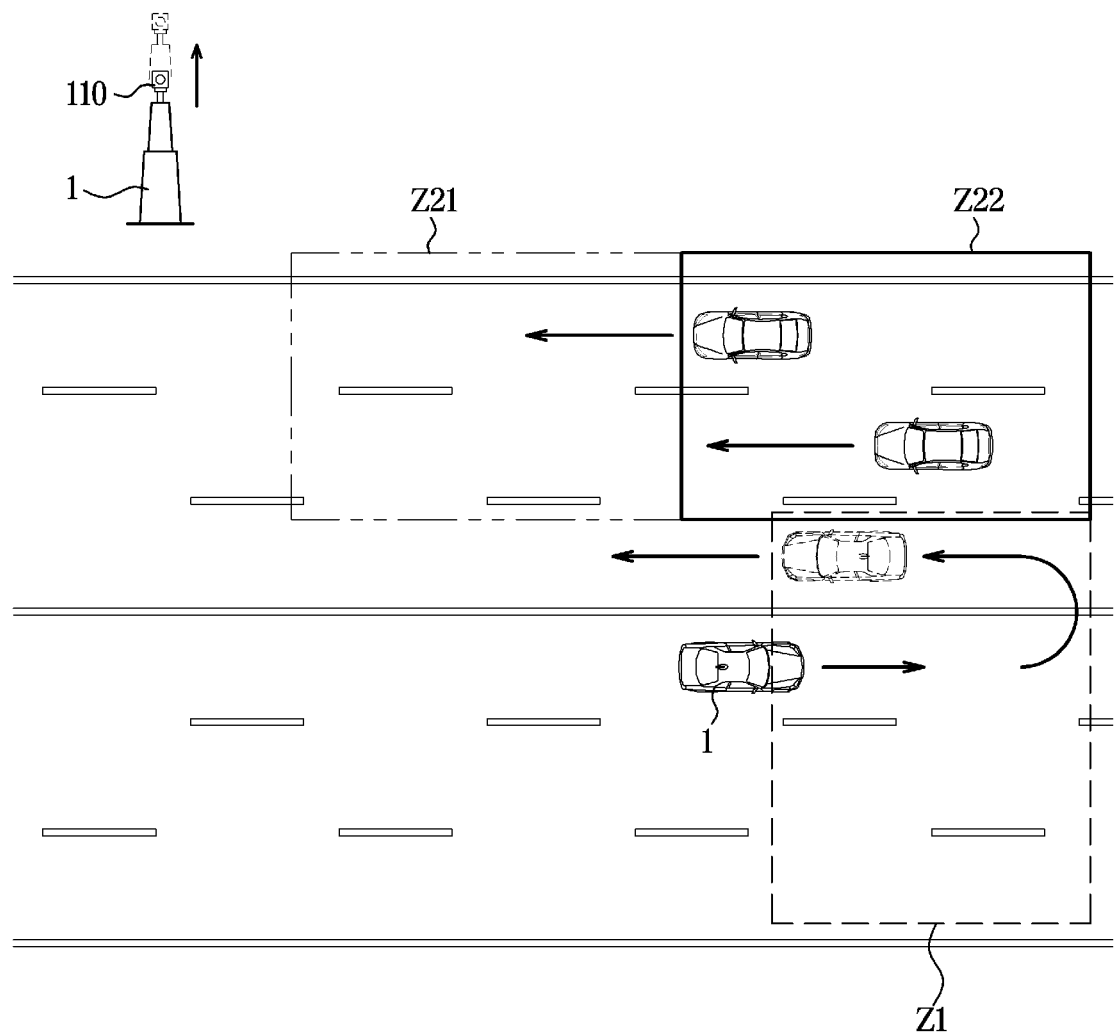

As shown in FIG. 10, the second processor 280 may, in order to acquire environment information of a wider range of roads, transmit a command to adjust the height and length of the first camera to the infrastructure 1, and then combine images Z21 and Z22 transmitted from the infrastructure 1 with an image Z1 of the second camera 220 to generate a top view image.

The second processor 280 may include a memory (not shown) for storing data regarding an algorithm for controlling the operations of the components of the vehicle 2 or a program representing the algorithm, and a processor (not shown) that performs the above-described operations using the data stored in the memory. In this case, the memory and the processor may be implemented as separate chips. Alternatively, the memory and the processor may be implemented as a single chip.

The second processor 280 may include a memory (not shown) for storing data regarding an algorithm for implementing operations of ADAS or a program representing the algorithm, and a processor (not shown) that performs the above-described operations using the data stored in the memory.

The second memory 281 may store image information about the shape of an obstacle.

The second memory 281 stores information about the reference proportion and the reference time.

The second memory 281 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random-access memory (RAM), or other storage media, such as a hard disk drive (HDD), a CD-ROM, and the like, but the implementation of the second memory 281 is not limited thereto.

The second communicator 290 may include one or more components that enable communication with an external device as well as internal parts of the vehicle, and may include, for example, at least one of a short-range communication module, a wired communication module, or a wireless communication module.

Here, the external device includes at least one of another vehicle, the infrastructure 1, and the server 3.

The short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, and a Zigbee communication module.

The wired communication module may include various wired communication modules, such as a controller area network (CAN) communication module, a local area network (LAN) module, a wide area network (WAN) module, or a value added network communication (VAN) module, and various cable communication modules, such as a universal serial bus (USB) module, a high definition multimedia interface (HDMI) module a digital visual interface (DVI) module, a recommended standard-232 (RS-232) module, a power line communication module, or a plain old telephone service (POTS) module.

The wired communication module may further include a Local Interconnect Network (LIN).

The wireless communication module may include wireless communication modules supporting various wireless communication methods, such as a Wi-Fi module, a wireless broadband module (Wibro) module, a global system for mobile communication (GSM) module, a code division multiple access (CDMA) module, a wideband code division multiple access (WCDMA) module, a universal mobile telecommunications system (UMTS) module, a time division multiple access (TDMA) module, a long term evolution (LTE) module, a ultra-wide band (UWB) module, and the like.

The components shown in FIG. 8 may refer to a software component and/or a hardware component, such as a Field Programmable Gate Array (FPGA) and an Application Specific Integrated Circuit (ASIC).

At least one component may be added or omitted to correspond to the performance of the components of the vehicle shown in FIG. 8. In addition, the mutual positions of the components may be changed to correspond to the performance or structure of the system.

Figure 11:
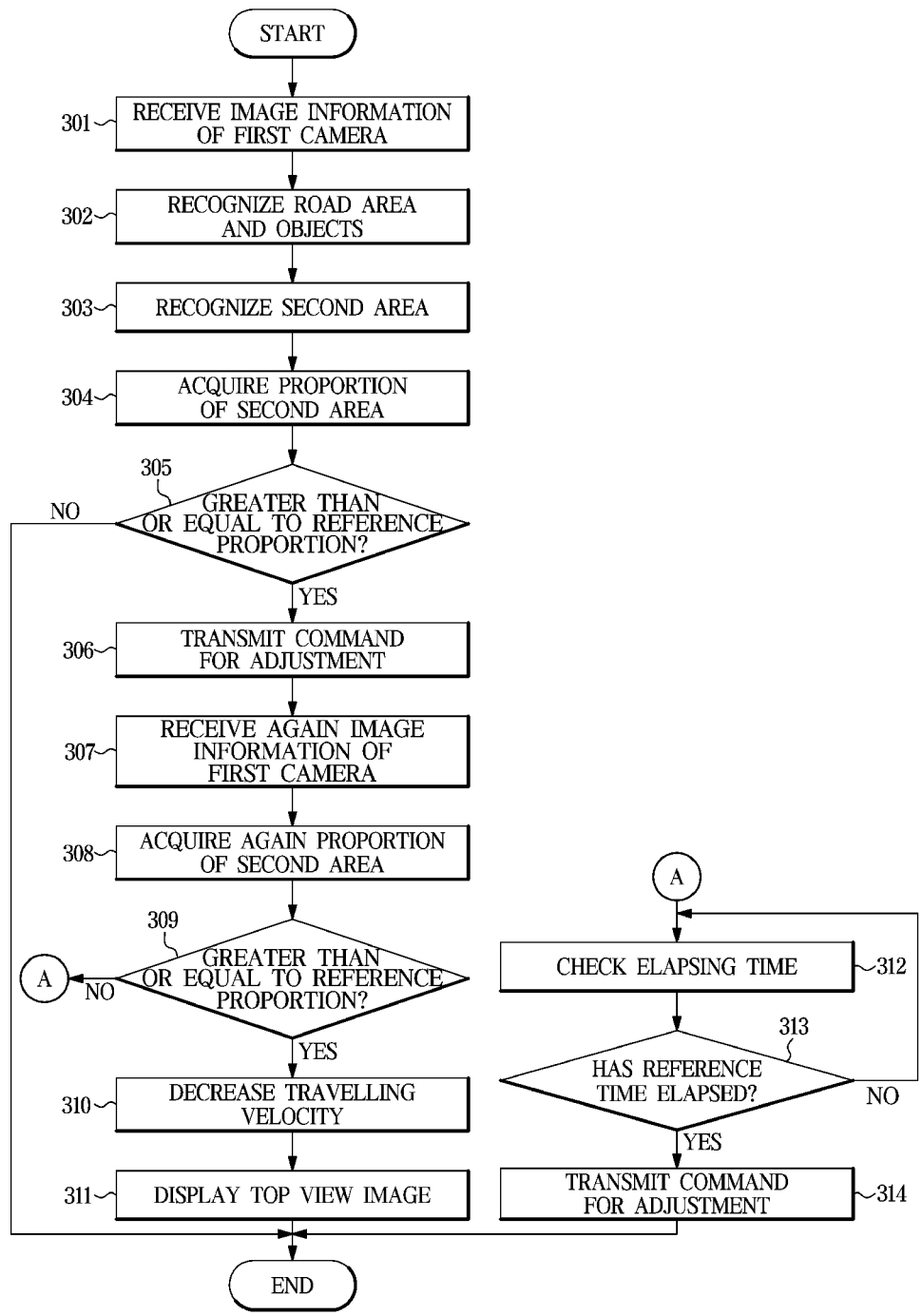
FIG. 11 is a control flowchart of a vehicle according to an embodiment.

FIG. 11 is a control flowchart of a vehicle that performs communication with an infrastructure according to an embodiment.

The vehicle 2 may request the infrastructure 1 to provide image information.

Thereafter, the vehicle 2 receives image information of the first camera 110 from the infrastructure 1 (301) and recognizes a hidden area based on the received image information.

In more detail, the vehicle 2 may recognize a road area based on the image information of the infrastructure 1 and recognize objects corresponding to obstacles existing in the road area (302).

The vehicle 2 acquires position information and size information of the recognized objects based on pixels of the image information.

The vehicle 2 identifies a first area A1 occupied by an object in the road area based on the acquired position information and size information of the objects, and recognizes a second area A2 except for the first area in the road area.

More specifically, the vehicle 2 may divide a road area R into N×M blocks, connect straight lines to the objects from the position of the second camera 220 of the vehicle 2, at which to provide image information, and recognize the second area A2 based on straight lines that intersect the outer edges of the object among the connected straight lines (303).

That is, the vehicle 2 may recognize an area, formed by the outer edge of the object and the straight line intersecting the outer edge of the object in the road area, as the second area.

The vehicle 2 may identify the number of blocks recognized as the second area, and based on the number of blocks forming the road area and the number of blocks recognized as the second area, acquire a proportion of the second area (304).

The vehicle 2 may, in response to the acquired proportion of the second area being greater than or equal to the reference proportion (305), transmit a command for adjusting the height and length of the first camera to the infrastructure 1 (306), and receive again the image information acquired through the first camera, of which the height and length are adjusted (307). Here, the command to adjust the height and length of the first camera may include a command to adjust the height and length of the first camera to the second height and the second length.

The vehicle 2 may recognize the road area and objects based on the image information again being received, and acquire the proportion of the second area based on the position information of the road area and the position information and size information of the object (308), and when the acquired proportion of the second area is greater than or equal to the reference proportion (309), decrease the travelling velocity (310).

The vehicle 2 may match information of the second area of the image acquired through the first camera 110 to the image acquired through the second camera 220, to generate a top view image, and display the generated top view image (311).

The vehicle 2 may acquire the proportion of the second area based on the image information again being received, and when the acquired proportion of the second area is less than the reference proportion, determine whether a reference time has elapsed from the time of adjusting the height and length of the first camera (312), and when it is determined that the reference time has elapsed (313), transmit a command for adjusting the height and length of the first camera to the infrastructure 1 (314). Here, the command to adjust the height and length of the first camera may include a command to adjust the height and length of the first camera to the first height and the first length.

The vehicle may receive the image of the first camera, of which the height and length are adjusted, and combine the received image with the image acquired through the second camera 220 to generate a top view image, and display the generated top view image (311).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random-Access Memory (RAM), a magnetic tape, a magnetic disk, a flash memory, an optical data storage device, and the like.

As is apparent from the above, the disclosure is implemented to increase the height of the camera only when needed, to acquire environmental information of a wider range of a road, thereby preventing the appearance of surrounding area from being spoiled and reducing damage to the camera caused by aerodynamics and collision with surrounding objects.

The disclosure is implemented to acquire information about obstacles in a wider range of the road area using image information of a camera of an infrastructure, and predict and determine in advance a risk of obstructing the visibility by nearby adjacent vehicles, thereby rapidly dealing with the risk in advance.

The disclosure is implemented to recognize obstacle information without adding a hardware configuration, thereby preventing an increase in the cost of the vehicle and improving the stability of the vehicle.

As described above, according to the disclosure, marketability of the vehicle may be improved, user satisfaction may be improved, and product competitiveness may be secured.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

What is claimed is:

1. A vehicle comprising:
   a communicator configured to perform communication with an infrastructure and receive image information of a first camera of the infrastructure;
   a display;
   a second camera; and
   a processor configured to:
      upon first image information of the first camera of the infrastructure being received through the communicator, recognize a road area and an obstacle based on the received first image information;
      recognize a hidden area, in which a field of view is obstructed by the obstacle, of the road area; and
      when a proportion of the hidden area to the road area of the first image information is greater than or equal to a reference proportion, transmit an adjustment command of the first camera to the infrastructure, and when the proportion of the hidden area to the road area of the first image information is less than the reference proportion, match an image of the hidden area to second image information of the second camera to generate a top view image, and control display of the generated top view,
   wherein the processor is configured to request provision of image information about the hidden area from the infrastructure, and generate the top view image based on the image information about the hidden area transmitted from the infrastructure.

2. The vehicle of claim 1, wherein when the proportion of the hidden area is less than the reference proportion, a command maintaining a height of the first camera at a first height and a command maintaining a length of the first camera at a first length are transmitted to the infrastructure.

3. The vehicle of claim 2, wherein the adjustment command of the first camera includes a command adjusting the height of the first camera at a second height and adjusting the length of the first camera at a second length.

4. The vehicle of claim 1, wherein the processor is configured to, upon determining that a reference time has elapsed from a point in time at which the first camera is adjusted, transmit an adjustment command changing a height of the first camera to a first height and changing a length of the first camera to a first length.

5. The vehicle of claim 1, wherein the processor is configured to:
   after the transmitting of the adjustment command of the first camera, re-recognize the road area and the hidden area based on image information re-transmitted from the infrastructure;
   acquire a proportion of the re-recognized hidden area to the re-recognized road area; and
   when the proportion of the re-recognized hidden area is less than the reference proportion, match an image of the re-recognized hidden image area to the second image information of the second camera to generate a top view image, and control display of the generated top view.

6. The vehicle of claim 5, wherein the processor is configured to, when the proportion of the re-recognized hidden area is greater than or equal to the reference proportion, control to reduce a travelling velocity.

7. The vehicle of claim 1, wherein the processor is configured to determine a possibility of collision based on the hidden area.

8. The vehicle of claim 1, wherein the processor is configured to control autonomous driving based on the hidden area.

* * * * *

UNITED STATES PATENT AND TRADEMARK OFFICE
CERTIFICATE OF CORRECTION

PATENT NO. : 12,335,623 B2
APPLICATION NO. : 18/064611
DATED : June 17, 2025
INVENTOR(S) : Kim et al.

Page 1 of 1

It is certified that error appears in the above-identified patent and that said Letters Patent is hereby corrected as shown below:

In the Claims

In Column 20, in Claim 5, Line 48, after "hidden" delete "image".

Signed and Sealed this
Twenty-second Day of July, 2025

Coke Morgan Stewart
*Acting Director of the United States Patent and Trademark Office*